Jan. 13, 1925.

R. KLEIN 1,523,129

PHOTOGRAPHIC SHUTTER

Filed Aug. 4, 1922     4 Sheets-Sheet 1

INVENTOR.
Rudolph Klein.
BY
his ATTORNEYS.

Jan. 13, 1925.
R. KLEIN
1,523,129
PHOTOGRAPHIC SHUTTER
Filed Aug. 4, 1922
4 Sheets-Sheet 2
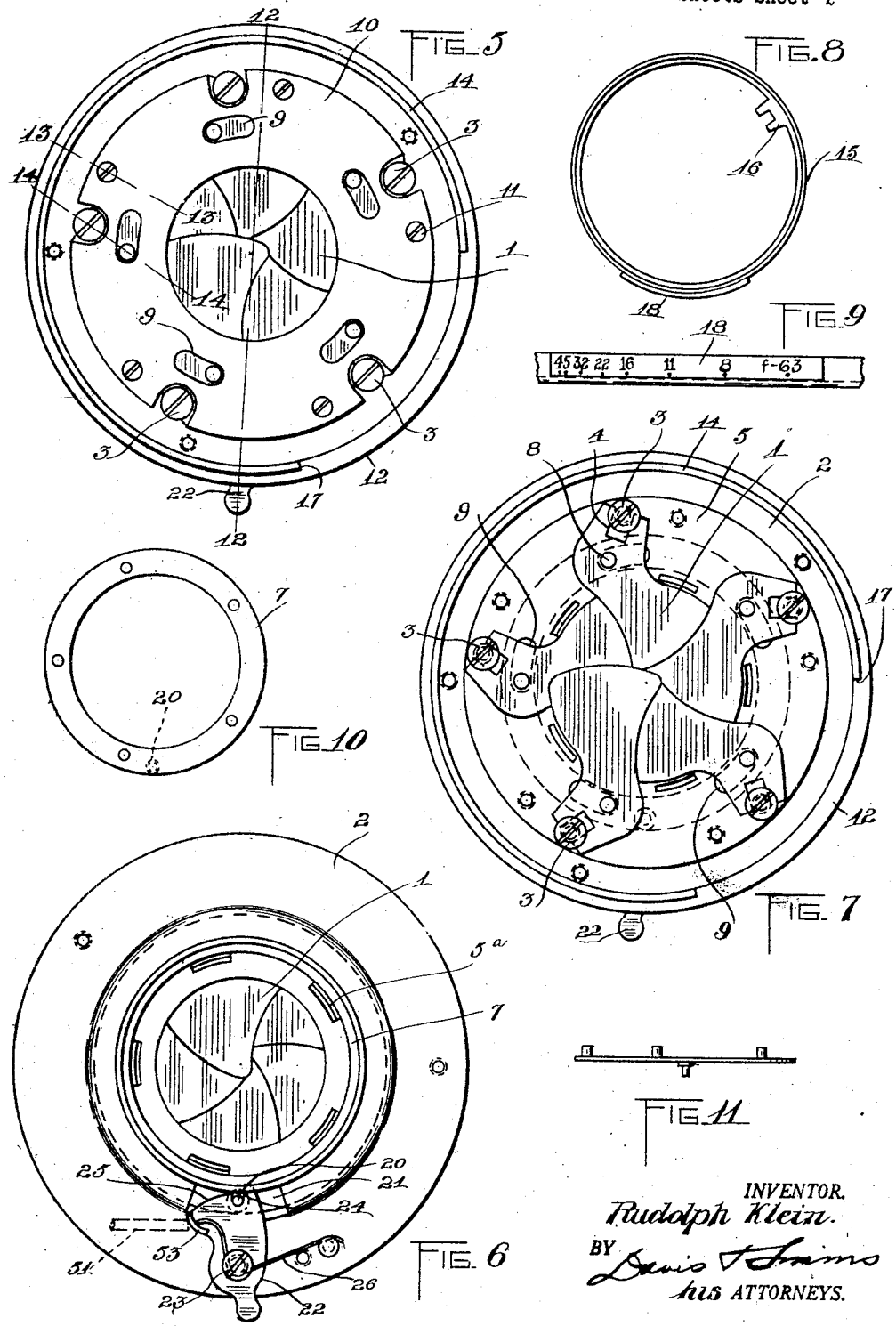
INVENTOR.
Rudolph Klein.
BY
his ATTORNEYS.

Jan. 13, 1925.
R. KLEIN
1,523,129
PHOTOGRAPHIC SHUTTER
Filed Aug. 4, 1922  4 Sheets-Sheet 3
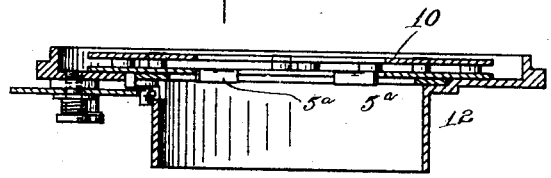
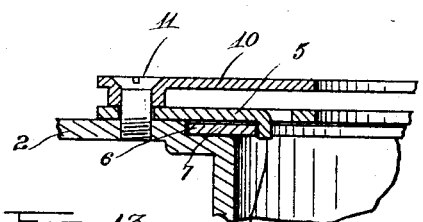
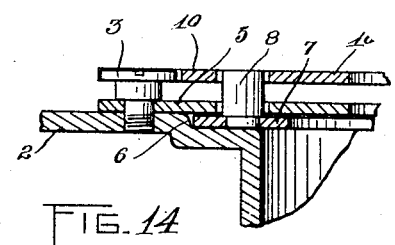
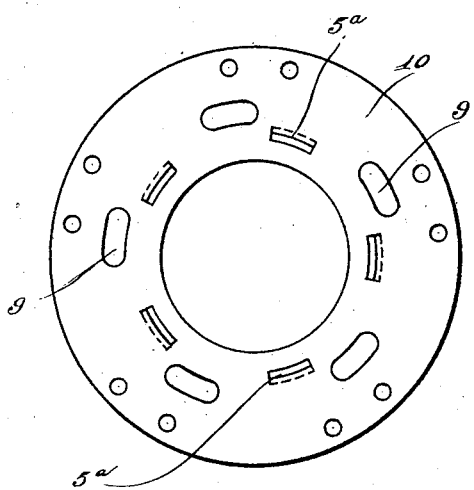
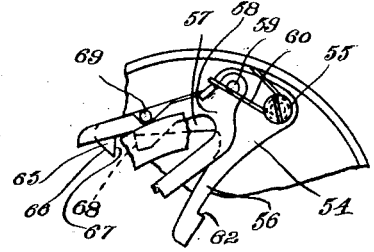
INVENTOR.
Rudolph Klein.
BY
his ATTORNEYS.

INVENTOR.
Rudolph Klein.
BY
his ATTORNEYS.

Patented Jan. 13, 1925.

1,523,129

UNITED STATES PATENT OFFICE.

RUDOLPH KLEIN, OF ROCHESTER, NEW YORK, ASSIGNOR TO ILEX OPTICAL COMPANY, OF ROCHESTER, NEW YORK, A CORPORATION OF NEW YORK.

PHOTOGRAPHIC SHUTTER.

Application filed August 4, 1922. Serial No. 579,619.

*To all whom it may concern:*

Be it known that I, RUDOLPH KLEIN, a citizen of the United States, and resident of Rochester, in the county of Monroe and State of New York, have invented certain new and useful Improvements in Photographic Shutters, of which the following is a specification.

The present invention relates to photographic shutters and more particularly to the type provided with an exposure mechanism in the form of blades, operated and controlled by a mechanism having a motor member in which energy is stored for effecting the opening and the closing of the shutter blades. An object of this invention is to provide a construction in which the shutter blades or exposure means is mounted on one casing or support and the operating and controlling mechanism is mounted on a separate casing or support adapted for connection with the casing or support on which shutter blades are mounted, so that the two casings or supports may be manufactured and sold independently. A further object of the invention is to provide a photographic shutter having two casings or supports, one for the shutter blade and the other for the operating and controlling mechanism for the blades, detachably connected together, so that the operating mechanism may be readily connected and disconnected from the shutter casing, in order that one operating mechanism may serve for a number of different exposure means.

A still further object of the invention is to provide a construction in which the operating and controlling mechanism will be arranged in a casing separate from the casing in which the exposure blades are mounted and will be connected on the casing for the exposure blades, in such a manner, that the effect of the vibrations in the operating and controlling mechanisms upon the shutter casing will be reduced to a minimum.

A still further object of the invention is to provide a construction in which the shutter blades and the shutter operating and controlling mechanism will be separated a considerable distance from each other, operative relationship being established through an extended longitudinally movable connection operable through a tubular member extending between the two casings in which the shutter blades and the operating and controlling mechanism are mounted.

To these and other ends, the invention consists of certain parts and combinations of parts, all of which will be hereinafter described, the novel features being pointed out in the appended claims.

In the drawings:

Fig. 5 is an interior view of the shutter with the shutter casing member containing the iris diaphragm removed;

Fig. 6 is a face view of the casing member in which the shutter blades are mounted, the housing for the exposure lever on said casing being removed to show the connection between said exposure lever and the exposure ring;

Fig. 7 is an interior view showing the manner in which the blades are mounted;

Fig. 8 is a detail view of the controlling ring;

Fig. 9 is an enlarged edge view of the controlling ring;

Fig. 10 is a detail view of the exposure ring;

Fig. 11 is an edge view of the exposure ring;

Fig. 12 is a sectional view on the line 12—12, Fig. 5, showing the shutter blades removed;

Fig. 13 is an enlarged section on the line 13—13, Fig. 5;

Fig. 14 is an enlarged sectional view on the line 14—14, Fig. 5;

Fig. 15 is a detail view of the bearing plate for the exposure ring;

Fig. 16 is a detail view of the detaining means;

Figure 1:
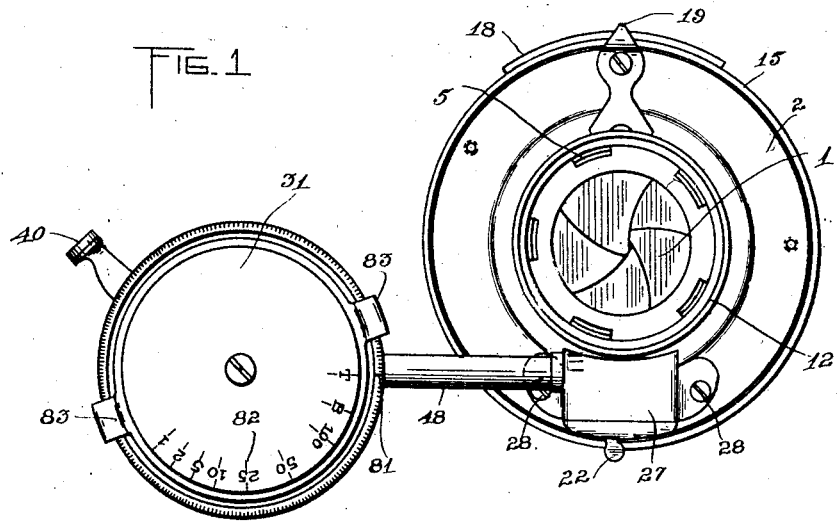
Fig. 1 is a view in elevation of a photographic shutter embodying the present invention.
Figure 2:
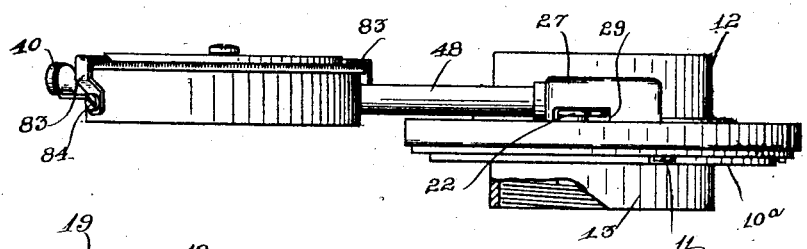
Fig. 2 is a view of the under side of the shutter.
Figure 3:
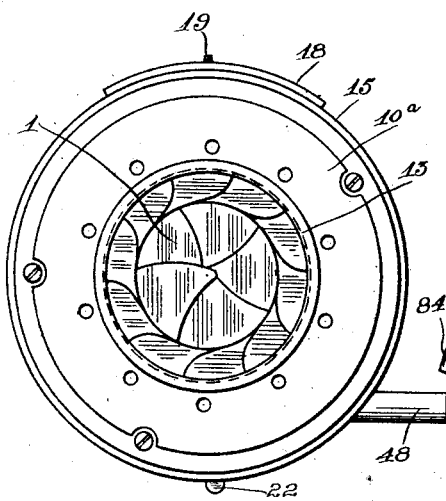
Fig. 3 is a rear view of the shutter.
Figure 4:
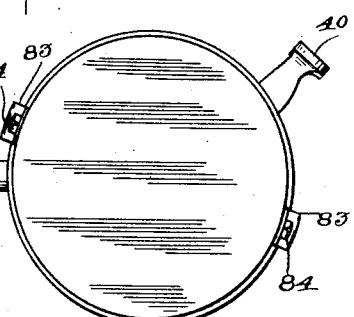
Fig. 4 is a detail sectional view of the connection between the shutter operating mechanism and the shutter blades.

The shutter blades 1, of which there may be any desired number, are arranged upon a casing which, in this instance, comprises an annular member 2 with a projecting lens tube 12, said blades being pivoted on one side of the annular member on headed projections or screws 3 by means of slots 4 formed in said blades. These headed projections or screws 3 serve to secure a bearing plate 5 on one side of the member 2 over an annular groove 6 in said plate in which an operating ring 7 is arranged, the operating ring turning on bearing lugs 5ª on the plate 5 and having projections 8 extending therefrom through slots 9 in the plate 5 and engaging the shutter blades 1. Over said annular member 2, the blades and bearing plate 5 a retaining plate 10 is secured by screws 11. A cover plate 10ª, carrying the iris diaphragm and a projecting lens tube 13 is secured over the blades and their mounting. An arcuate flange 14 projects from the member or plate 2 near the periphery of said plate 2 for abutment by plate 13 and between these members a controlling ring 15 is mounted for controlling the position of the iris diaphragm, this controlling ring having a projection 16 operating in the space 17 between the ends of the arcuate flange 14. An indicator plate 18 is provided on the controlling ring 15 and cooperates with a pointer 19 on the shutter casing for determining the adjustment of the iris diaphragm. The exposure ring 7 has a projection 20 extending through a slot 21 in the casing 2 and connecting with an exposure lever or member 22, which is pivoted at 23 to the annular casing member 2. This exposure lever is formed with a notch 24 and a curved surface 25, the latter being concentric with the pivot of the member 22. A spring 26 acts on the lever 22 in a direction to hold the latter, so that the projection 20 lies in the notch 24. When the lever 22 is shifted from this position, the projection 20 is shifted so that the ring 7 is turned to open the blades 1. After the blades have reached their open positions, the projection 21 will be in cooperation with the curved surface 25 and the lever 22 may continue its movement without affecting the open positions of the blades, while, at the same time, holding the blades in such open positions. A housing 27 is fastened by screws 28 to the housing 2 over said lever member 22, said housing having a slot 29 through which the one end of the lever 22 may project to permit manual operation of said lever for the purpose of opening the blades, the blades being returned to closed position when said lever is released, this action being accomplished through the spring 26 acting on said lever and causing the walls of the notch 24 to reengage the projection 21.

Figure 17:
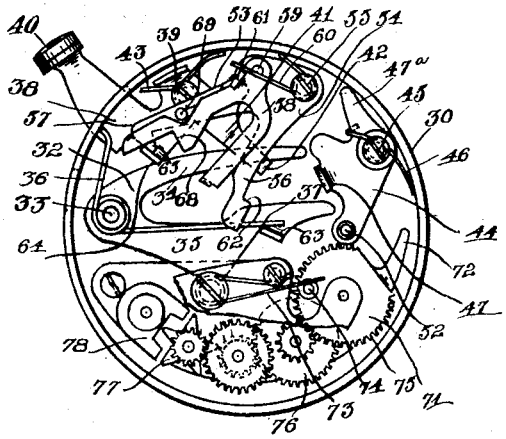
Fig. 17 is an interior view of the shutter operating mechanism, showing the parts in normal positions.
Figure 19:
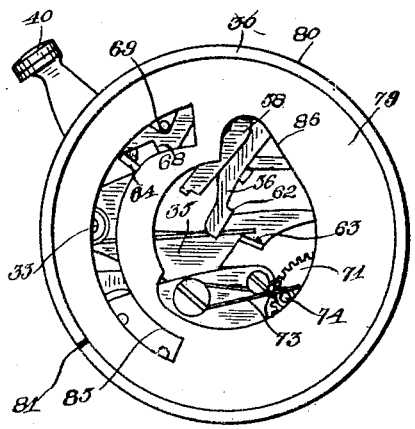
Fig. 19 is an interior view of a shutter operating mechanism, showing the manner of controlling the detaining means and the retarding mechanism.
Figure 18:
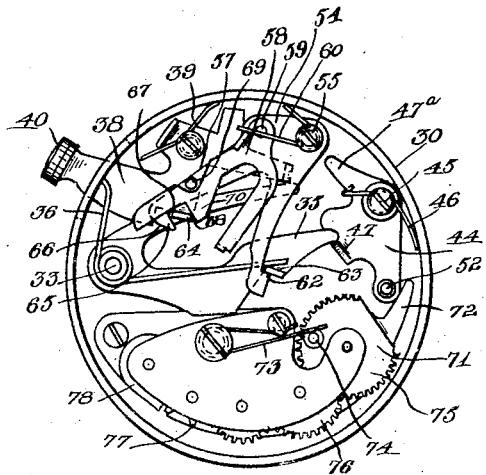
Fig. 18 is a view, similar to Fig. 17, showing the shutter adjusted for time exposure.
Figure 20:
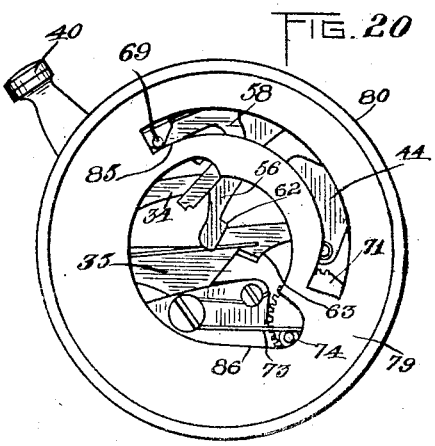
Fig. 20 is a view similar to Fig. 19, showing the controlling means adjusted to another position.
Figure 21:
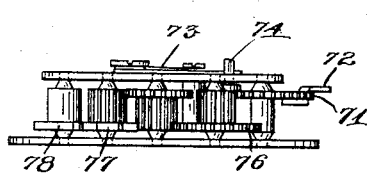
Fig. 21 is an edge view of the retarding mechanism.
Figure 22:
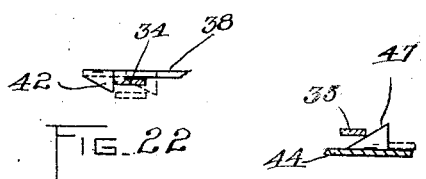
Fig. 22 is a detail view of the slip-off connection between the actuating member and the master member.
Figure 23:
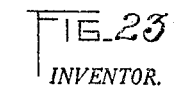
Fig. 23 is a detail view of the slip-off connection between the master member and the proximate exposure lever.

The operating and controlling mechanism for the shutter blades is mounted in a casing or support separate from the casing or support of the shutter blades. In this instance, this separate casing embodies a cup shaped member 30 with a cover plate 31. In this cup shaped member is mounted a master or motor member 32, pivoted at 33, and having two arms 34 and 35 projected substantially in parallel relation. A spring 36 acts on a projection 37 on the arm 35 to move the master member in one direction. For moving the master member in the opposite direction, there may be employed an actuating member 38, pivoted at 39 within the casing member 30 and having one arm projected to the exterior of the casing and provided with a finger piece 40 through which said actuating lever is moved. This lever also has another arm 41 which is provided with a bevelled projection 42, adapted to cooperate with the arm 34 of the master member. This bevelled projection deflects the arm 34 of the master member 32 laterally when the actuating lever moves to the position shown in Fig. 17 from that shown in Fig. 18, after the master member is in normal position, so that the projection 42 may engage behind the master lever, the actuating lever 38 being moved to this normal position under the action of its spring 43. When the actuating lever 38 is depressed through the finger piece 40, the master member is shifted through the projection 42 to store energy in the spring 36, in order that the master member may return to normal position under the action of said spring 36 after it is freed by the projection 42 sliding off the end of the arm 34. The master member on its return movement shifts an exposure member or lever 44, which is pivoted at 45 within the member 30 and is normally held by a spring 46 with the abutment arm 47ª thereof against the casing as shown in Fig. 17. As the master member moves to store energy in the spring 36 under the action of the actuating lever 38, the flexible arm 35 of the master member cooperates with the bevelled projection 47 on the exposure lever 44, riding over said projection. Upon the return movement of the master member under the action of the spring 36, the arm 35 of the master member, through the engagement with the member 47, shifts the exposure lever against the tension of the spring 46 until the end of the arm 35 slips off the projection 47.

The exposure lever 44 of the shutter operating and controlling mechanism connects with the exposure lever 22 of the exposure mechanism, this connection, in this instance, being established by providing a tubular member 48 which has a screw threaded connection 49 with the casing 30 and has detachable screw threaded connection 50 with the housing 27. In this tubular connecting member 48, an extended operating connection is provided preferably in the form of a rod 51, which is pivotally connected at 52 to the exposure lever 44 and abuts a lateral projection 53 on the exposure lever 22. This arrangement provides a lost motion connection with the exposure lever 22 and permits the operation of the exposure lever 22 independently of the connecting rod 51, so that the blades may be operated for focussing the camera without destroying the adjustment. This arrangement also permits the shutter operating mechanism with the connecting tube 48 to be disconnected from the shutter blade casing.

It is apparent that time exposure may be obtained by manipulating the exposure lever 22 through the end thereof exposed through the housing 27. The time exposure through the actuating lever 38 is obtained by a detent 54 which has a loose pivotal connection on a pin 55 and is provided with two arms 56 and 57 as well as with a latch 58, pivoted at 59 thereon, to one side of the loose pivotal connection 55. A spring 60 acts on the detent at 61 and through the latter on the latch, normally tending to move said parts in one direction. The arm 56 of the detent 54 has a shoulder 62, which is adapted to cooperate with a shoulder 63 on the arm 35 of the master member to hold said master member in a position where it cooperates with the projection 47 of the exposure lever 44 and maintains the shutter blades in open positions, the spring 60 acting on the detent 54 in a direction to move the shoulder 62 into the path of the shoulder 63 on the arm of the master member 35. In order that this detent may be controlled by the actuating lever 38, the latter has a lateral projection 64 which cooperates with the arm 57 on the detaining member, said arm having a projection 65, one side 66 of which cooperates with the projection 64 to hold the detent shoulder 62 out of cooperation with the master member, as shown in Fig. 17. The other side 67 of this projection 65 is adapted to cooperate with the projection 64 on the actuating lever to hold the latter against complete return movement under the action of the spring 43, after the actuating lever has released the master member and before the latter is released by the shoulder 62. The latch 58 is provided for the purpose of releasing the actuating lever 38 from the detent shoulder 67, and to this end said latch has a surface 68 which, when the projection 64 cooperates with the shoulder 67, lies in engagement with the projection 64, so that if the actuating lever, while held by the detent shoulder 67, is depressed, it will cooperate with the shoulder 68 on the latch 58 and shift the detaining member, so as to bring the shoulder 62 on said detaining member out of engagement with the shoulder 63 on the master member, thus releasing the master member to the action of its spring 36 and permitting the master member to move to normal position, as shown in Fig. 17, releasing, at the same time, the exposure lever 44, which it had held to hold the shutter blades open for time exposure.

The detent 54 has its movement under the spring 60 controlled through the projection 69 in such a manner that, when the actuating lever 38 is depressed, the shoulder 67 does not enter into the path of the projection 64 on the actuating lever, but, instead, the extreme end of the projection 65 will lie in the path of the projection 64 on the actuating lever. At the same time, the shoulder 62 will permit the detent to move in the path of the projection 63 on the other arm of the master member. Furthermore, on the depression of the lever 38, the projection 64 passes under the projection 70 on the latch 58 so that the shoulder 68 will not be engaged by the projection 64. As soon as the actuating lever is released, the projection 64 on the actuating lever cooperates with the end of the projection 65 on the latch 54 and shifts such latch on its pivot, thus carrying the shoulder 62 out of engagement with the projection 63 on the master lever, which engagement took place, after the actuating lever 38 had been pressed far enough to cause the bevelled projection 42 thereon to slide off the end of the arm 34 of the master member, whereby the master member moved a short distance under the action of its spring 36 to shift the exposure lever 44 in order to effect the opening of the shutter blades, this opening having been maintained so long as the pressure was maintained on the actuating lever 38.

With the shifting of the shoulder 62 on the detent out of the path of the projection 63 on the arm 35 of the master lever, due to the release of the pressure on the actuating lever 38, the arm 35 of the master member slips off the bevelled projection 47 and releases the exposure lever 34, so that the latter may effect the closing of the shutter blades, the master member returning to its normal position.

Automatic actuation of the shutter blades, that is, actuation of the shutter blades independently of the detaining means is effected by shifting the detaining means through the projection 69, so that it performs no action whatsoever on the master member. Under this condition, the pressure on the actuating lever 38 causes the bevelled projection 42 thereon to cooperate with the arm 34 of the master member, until the projection 42 rides or slips over the end of such arm, when the master member is freed and its arm 35, which had previously slipped over the bevelled projection 47, engages such projection 47 and shifts the exposure lever to open the shutter blades and then to ride off the projection 47 in order to permit the exposure lever to effect the closing of the shutter blades.

With the end in view of varying the duration of the so called automatic exposure, a retarding mechanism is employed and is mounted upon the housing, which contains the operating mechanism. This retarding mechanism, in this instance, embodies an oscillatory member 71, having an arm 72, which is adapted to cooperate with the pin 52 on the exposure member 44 to which the rod 51 is connected. This oscillatory member is moved in one direction under the action of a spring 73, which engages a pin 74 eccentrically arranged on the oscillatory member. The oscillatory member through teeth 75 thereon connects with a train of gears 76, which in turn are controlled by a star wheel 77, engaged by an oscillatory anchor 78. The spring 73 tends normally to hold the arm 72 toward the projection 52, and, when the projection 52 is swung toward the arm 72 under the action of the arm 35 of the master member, the arms 72 with the train of gears 76 and the star wheel 77 and its anchor 78 retard the movement of the shutter blade. Upon the return of the exposure lever to its normal position illustrated in Fig. 17, the oscillatory member 71 follows the exposure lever under the action of the spring 73. It is apparent that, if the position of the arm 72 be varied with reference to the pin 52, the amount of the controlling action will be varied or will be made nil. This control of the retarding mechanism is effected by the oscillatory member 71 through the pin 74.

A common controlling means is preferably employed for the retarding mechanism and the detaining means. In this instance, this common controlling means embodies a controlling member 79 in the form of a disk arranged between the cover plate 31 and the casing and having a peripheral portion 80 projecting beyond the periphery of the cover plate in order to permit the manual turning of the controlling member. The periphery of this disk 79 is provided with a pointer or index 81 which is adapted to be turned to register with the usual indicating matter 82, provided, in this instance, on the cover plate 31, the cover plate 31 having arms 83 at diagrammatically opposite points extending around the controlling disk 79 and secured by screws 84 to the side walls of the casing, which engages the operating mechanism and the retarding mechanism. In order to connect with the detaining means this rotary controlling member or disk 79 is provided with a cam surface 85, which cooperates with the pin 69 on the detaining member to hold the latter in its three positions, namely, the position for time exposure, the position for bulb exposure and the position for so called automatic exposure. The controlling disk 79 also has a a cam surface 86 for cooperating with the pin or projection 74 on the retarding mechanism, this surface being, so formed, that it holds the retarding mechanism out of action during bulb and time exposures and also for one speed of so called automatic exposure. For the other speeds of automatic exposure, this surface controls the projection 74 in such a manner that with the greater the speed, the greater will be the distance between the arm 72 on the oscillatory member 71 and the projection 52 on the exposure lever 44.

What I claim as my invention and desire to secure by Letters Patent is:

1. A photographic shutter comprising two supports, a tubular connection between them, shutter blades on one of said supports, a master member arranged on the other support, detaining means for the master member mounted on such other support, controlling means for the detaining means adjustable to obtain time, bulb, and instantaneous exposures, and means extending through said tubular connection for operating said shutter blades from the master member.

2. A photographic shutter comprising two supports, a tubular connection between the supports, shutter blades mounted on one of said supports, a master member mounted on the other of said supports, detaining means for the master member mounted on said other support, means mounted on said other support for controlling said detaining means to obtain time, bulb and instantaneous exposures, means extending through said tubular connection for operating the shutter blades from the master member, said means having a lost motion connection with the shutter blades permitting the latter to be moved independently of the connection, and a finger piece on the support carrying the shutter blades through which the shutter blades may be moved to open position independently of said connection.

3. A photographic shutter comprising a support, shutter blades on said support, an exposure ring connected with the blades, an exposure lever connected with the ring and having a finger piece through which the ring may be turned to open the shutter, a second support, a tubular connection between the second support and the first mentioned support, a master member mounted on the second mentioned support, detaining means on the second mentioned support, means on the second support for controlling said detaining means to obtain time, bulb and instantaneous exposures, and a connection between the master member and the exposure lever on the first named support, said connection extending through said tubular connection.

4. A photographic shutter comprising a support, shutter blades movable on said support, an exposure lever pivotally mounted on the support and having a finger piece through which the blades may be opened, a second support, an exposure member mounted on said second support, a tubular connection between the two supports, a longitudinally movable member connected with the exposure member on the second support and having a lost motion connection with the member on the first named support so that the latter may be moved independently thereto to open the shutter blades, a master member on the second mentioned support for operating with the exposure lever on the first mentioned support, said master member moving in one direction without affecting the exposure lever and moving in the other direction to effect the opening and the closing of the shutter blades, detaining means mounted on the second support, and means on the second support for controlling said detaining means to produce through the shutter blades time, bulb and instantaneous exposures.

5. A photographic shutter comprising a support, shutter blades movably mounted on said support, an exposure member on said support connected with said shutter blades, means connected with the exposure member through which the shutter blades may be opened, a second support, a tubular connection between the two supports, an exposure member mounted on the second support, a longitudinally movable member connected with the second mentioned exposure member extending through the tubular connection and having a lost motion connection with the exposure member on the first mentioned support permitting the exposure member to be operated independently of said connection, a master member on the second support having connection with the exposure member permitting the master member to be moved in one direction without affecting the exposure member and to be moved in other direction to effect the opening and the closing of the shutter blades, a detaining means on the second support, and means controlling said detaining means for producing through the shutter blades time, bulb and instantaneous exposures.

6. A photographic shutter comprising a support, shutter blades movably mounted on said support, an exposure member on said support connected with said shutter blades, means connected with the exposure member through which the shutter blades may be opened, a second support, a tubular connection between the two supports, an exposure member mounted on the second support, a longitudinally movable member connected with the second mentioned exposure member extending through the tubular connection and having a lost motion connection with the exposure member on the first mentioned support, permitting the exposure member to be operated independently of said connection, a master member on the second support having connection with the exposure member permitting the master member to be moved in one direction without affecting the exposure member and to move in the other direction to effect the opening and the closing of the shutter blades, a detaining means on the second support, means controlling said detaining means for producing through the shutter blades time, bulb and instantaneous exposure, retarding means on the second mentioned support, and means controlling the retarding means to cause it to vary the duration of the instantaneous exposures.

7. A photographic shutter comprising a support, shutter blades movably mounted on said support, an exposure member on said support connected with said shutter blades, means connected with the exposure member through which the shutter blades may be opened, a second support, a tubular connection between the two supports, an exposure member mounted on the second support, a longitudinally movable member connected with the second mentioned exposure member extending through the tubular connection and having a lost motion connection with the exposure member on the first mentioned support, permitting the exposure member to be operated independently of said connection, a master member on the second support having connection with the exposure member permitting the master member to be moved in one direction without affecting the exposure member and to move in the other direction to effect the opening and the closing of the shutter blades, a detaining means on the second support, means controlling said detaining means for producing through the shutter blades time, bulb and instantaneous exposure, retarding means on the second mentioned support, and means controlling the retarding means to cause it to vary the duration of the instantaneous exposures, said retarding means acting on the exposure member of the second mentioned support.

RUDOLPH KLEIN.